United States Patent
Shimazu et al.

(10) Patent No.: US 9,902,354 B2
(45) Date of Patent: Feb. 27, 2018

(54) VEHICLE PRE-CRASH SEAT BELT DEVICE

(71) Applicant: TOYOTA JIDOSHA KABUSHIKI KAISHA, Toyota-shi, Aichi-ken (JP)

(72) Inventors: Katsuya Shimazu, Toyota (JP); Akihisa Miyata, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 76 days.

(21) Appl. No.: 15/003,908

(22) Filed: Jan. 22, 2016

(65) Prior Publication Data

US 2016/0214554 A1   Jul. 28, 2016

(30) Foreign Application Priority Data

Jan. 26, 2015   (JP) ................................. 2015-012628

(51) Int. Cl.
| | |
|---|---|
| *B60R 21/00* | (2006.01) |
| *B60R 21/013* | (2006.01) |
| *B60R 22/03* | (2006.01) |
| *B60R 22/10* | (2006.01) |
| *B60R 22/34* | (2006.01) |
| *B60R 21/01* | (2006.01) |

(52) U.S. Cl.
CPC ............ *B60R 21/013* (2013.01); *B60R 22/03* (2013.01); *B60R 22/105* (2013.01); *B60R 22/34* (2013.01); *B60R 2021/01272* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,655,312 A | * | 4/1987 | Frantom | B60R 22/44 180/268 |
| 5,607,118 A | * | 3/1997 | Dybro | B60R 22/4676 242/379.1 |
| 5,611,498 A | * | 3/1997 | Miller, III | B60R 22/3413 242/379.1 |
| 6,145,881 A | * | 11/2000 | Miller, III | B60R 22/1951 280/801.2 |

(Continued)

FOREIGN PATENT DOCUMENTS

| | | |
|---|---|---|
| JP | 04-081855 U | 7/1992 |
| JP | 2002-211354 A | 7/2002 |

(Continued)

*Primary Examiner* — Jonathan L Sample
(74) *Attorney, Agent, or Firm* — Sughrue Mion, PLLC

(57) ABSTRACT

A vehicle pre-crash seat belt device includes: a buckle moving mechanism that moves a buckle, with which a tongue that has a webbing inserted therein engages, between a normal position and a raised position that is further toward a seat upper side than the normal position; a retractor that includes: a spool and a lock mechanism that locks rotation of the spool in the pull-out direction, and that releases the locked state by causing rotation of the spool in the take-up direction; and a controller that, due to a signal from a collision prediction sensor that predicts a collision of a vehicle, causes rotation of the spool in the take-up direction and increases tension acting on the webbing, and actuates the buckle moving mechanism to move the buckle from the normal position toward the raised position in a case in which the vehicle collision has been avoided.

10 Claims, 7 Drawing Sheets

(56) References Cited

U.S. PATENT DOCUMENTS

| | | | | |
|---|---|---|---|---|
| 6,213,512 | B1* | 4/2001 | Swann | B60R 22/46 180/271 |
| 6,419,176 | B1* | 7/2002 | Mizuno | B60R 22/4628 242/374 |
| 2002/0021041 | A1* | 2/2002 | Jessup | B60N 2/4221 297/468 |
| 2002/0041088 | A1* | 4/2002 | Grace | B60R 21/18 280/733 |
| 2002/0066818 | A1* | 6/2002 | Tanji | B60R 22/343 242/383 |
| 2003/0052210 | A1* | 3/2003 | Smithson | B60R 22/40 242/383 |
| 2003/0217882 | A1* | 11/2003 | Sakakida | B60R 22/24 180/268 |
| 2004/0164529 | A1* | 8/2004 | Yoshida | B60N 2/2806 280/730.2 |
| 2004/0251366 | A1* | 12/2004 | Hishon | B60R 22/44 242/390.8 |
| 2004/0251367 | A1* | 12/2004 | Suzuki | B60R 21/0132 242/390.8 |
| 2005/0011983 | A1* | 1/2005 | Inuzuka | B60R 22/46 242/390.9 |
| 2006/0082128 | A1* | 4/2006 | Clute | B60R 22/4676 280/807 |
| 2006/0231664 | A1* | 10/2006 | Takao | B60R 22/44 242/374 |
| 2006/0237570 | A1* | 10/2006 | Takao | B60R 22/44 242/374 |
| 2007/0282505 | A1* | 12/2007 | Bolton | B60R 22/02 701/45 |
| 2008/0203210 | A1* | 8/2008 | Nagata | B60R 22/4676 242/396.1 |
| 2009/0008919 | A1* | 1/2009 | Mather | B60R 22/1951 280/807 |
| 2009/0322141 | A1* | 12/2009 | Matsushita | B60R 22/03 297/483 |
| 2010/0123348 | A1* | 5/2010 | Hiramatsu | B60R 22/4676 297/476 |
| 2012/0204812 | A1* | 8/2012 | Singh | B60R 22/10 119/771 |

FOREIGN PATENT DOCUMENTS

| | | |
|---|---|---|
| JP | 2004-268661 A | 9/2004 |
| JP | 2006-131100 A | 5/2006 |
| JP | 2006-182326 A | 7/2006 |
| JP | 2007-083883 A | 4/2007 |
| JP | 2009-262645 A | 11/2009 |
| JP | 2010-155572 A | 7/2010 |
| JP | 2011-016482 A | 1/2011 |
| JP | 2015-006817 A | 1/2015 |

* cited by examiner

VEHICLE PRE-CRASH SEAT BELT DEVICE

CROSS-REFERENCE TO RELATED APPLICATION

This application is based on and claims priority under 35 USC 119 from Japanese Patent Application No. 2015-012628 filed on Jan. 26, 2015, the disclosure of which is incorporated by reference herein.

BACKGROUND

Technical Field

The present invention relates to a vehicle pre-crash seat belt device.

Related Art

Vehicle pre-crash seat belt devices have been described in which, in a vehicle provided with a collision prediction sensor, a spool of a retractor is rotated to take up webbing so as to increase the restraining force of the webbing on an occupant when the collision prediction sensor has predicted a vehicle collision. The retractor is provided with a lock mechanism that locks the spool, and in Japanese Patent Application Laid-Open (JP-A) No. 2004-268661, in cases in which a vehicle collision has been avoided, the locking of the spool is released by rotating a motor of the retractor in a webbing take-up direction. In JP-A No. 2009-262645, the spool is rotated in the take-up direction to release locking of the spool by a moving pulley provided between the retractor and a shoulder anchor being moved downward to relax the webbing. Configurations in which a shoulder anchor is moved downward to release the locking of the spool have also been described.

SUMMARY

However, in the vehicle pre-crash seat belt device described in JP-A No. 2004-268661, the spool is further rotated in the take-up direction from a state in which the webbing has been taken up in anticipation of a collision, such that the occupant may feel constricted. In the vehicle pre-crash seat belt device described in JP-A No. 2009-262645, it is necessary to provide the moving pulley for the sole purpose of relaxing the webbing, and there is therefore room for improvement from the perspective of reducing the number of components. In cases configured to move the shoulder anchor, when the shoulder anchor is at the lowest end position, the webbing cannot be made to relax.

In consideration of the above circumstances, an object of the present invention is to obtain a vehicle pre-crash seat belt device capable of suppressing a feeling of constriction from being imparted on an occupant in cases in which a vehicle collision has been avoided, while suppressing an increase in the number of components.

To achieve the aforementioned objective, a vehicle pre-crash seat belt device of a first aspect of the present invention includes: a buckle moving mechanism that moves a buckle, with which a tongue that has a webbing inserted therein engages, between a normal position and a raised position that is further toward a seat upper side than the normal position, a retractor that includes: a spool around which one end portion of the webbing is wound and that is configured to rotate in a take-up direction and a pull-out direction of the webbing, and a lock mechanism that locks rotation of the spool in the pull-out direction, and that releases the locked state by causing rotation of the spool in the take-up direction, and a controller that, due to a signal from a collision prediction sensor that predicts a collision of a vehicle, causes rotation of the spool in the take-up direction and increases tension acting on the webbing, and actuates the buckle moving mechanism to move the buckle from the normal position toward the raised position in a case in which the vehicle collision has been avoided.

In the vehicle pre-crash seat belt device of the first aspect, the retractor includes the spool that the one end portion of the webbing is wound, and the spool is configured to rotate in the take-up direction and the pull-out direction of the webbing. The retractor also includes the lock mechanism that locks the rotation of the spool in the pull-out direction. The lock mechanism releases the locked state by causing rotation of the spool in the take-up direction. The controller that rotates the spool in the take-up direction due to a signal from the collision prediction sensor that predicts a vehicle collision is also provided. Accordingly, when a collision is predicted, tension acting on the webbing is increased, thereby enabling the restraining force of the webbing on the occupant to be increased. The occupant can be suppressed from moving under inertia toward the vehicle front by actuating the lock mechanism during sudden braking.

The buckle moving mechanism that moves the buckle between the normal position and the raised position is provided to the vehicle pre-crash seat belt device. In cases in which a vehicle collision has been avoided, the controller is configured so as to actuate the buckle moving mechanism to move the buckle from the normal position toward the raised position. Accordingly, in cases in which a vehicle collision has been avoided after rotating the spool in the take-up direction to take up the webbing when a collision is predicted, the controller actuates the buckle moving mechanism to move the buckle from the normal position toward the raised position. The webbing accordingly relaxes, and the spool rotates in the take-up direction, releasing the locked state of the spool. In this manner, a feeling of constriction can be suppressed from being imparted on the occupant when locking of the spool is released.

During boarding or the like, it becomes easier for the occupant to engage the tongue with the buckle due to the buckle being moved from the normal position to the raised position by the buckle moving mechanism. Namely, ease of putting on the seat belt can be improved using the buckle moving mechanism. Moreover, additional components provided for the sole purpose of relaxing the webbing are unnecessary since the locking of the spool is released using the buckle moving mechanism in cases in which a vehicle collision has been avoided.

A vehicle pre-crash seat belt device of a second aspect of the present invention is the first aspect, wherein in a case in which the vehicle has collided after the controller is input with the signal from the collision prediction sensor, the controller maintains the buckle in the normal position, and in a case in which the vehicle collision has been avoided after the controller is input with the signal from the collision prediction sensor, the controller actuates the buckle moving mechanism to move the buckle from the normal position toward the raised position, and then moves the buckle toward the normal position.

In the vehicle pre-crash seat belt device of the second aspect, during a vehicle collision, the buckle is maintained in the normal position, enabling the webbing to be suppressed from relaxing. In cases in which the vehicle collision has been avoided, the buckle is moved toward the normal position after the buckle has been moved toward the raised position to relax the webbing.

A vehicle pre-crash seat belt device of a third aspect of the present invention is the second aspect, wherein after actuating the buckle moving mechanism to move the buckle from the normal position toward the raised position, the controller determines whether or not the buckle has reached the raised position, and in a case in which the buckle has reached the raised position, the controller actuates the buckle moving mechanism to move the buckle toward the normal position.

A vehicle pre-crash seat belt device of a fourth aspect of the present invention is the second aspect, wherein after a specific amount of time has elapsed since actuating the buckle moving mechanism to move the buckle from the normal position toward the raised position, the controller actuates the buckle moving mechanism to move the buckle toward the normal position.

A vehicle pre-crash seat belt device of a fifth aspect of the present invention is any one of the first aspect to the fourth aspect, wherein in a case in which an occupant has opened a vehicle door when boarding the vehicle, the controller actuates the buckle moving mechanism to move the buckle from the normal position toward the raised position, and the controller actuates the buckle moving mechanism to move the buckle from the raised position toward the normal position due to the tongue being engaged with the buckle.

In the vehicle pre-crash seat belt device of the fifth aspect, during boarding, when putting on the seat belt, the buckle can be moved toward the raised position without the occupant operating the buckle moving mechanism.

A vehicle pre-crash seat belt device of a sixth aspect of the present invention is the fifth aspect, wherein the buckle moving mechanism is provided to both a driver seat and a front passenger seat, and in a case in which a vehicle door on the driver seat side is opened, the controller actuates the buckle moving mechanism on the driver seat side, and in a case in which a vehicle door on the front passenger seat side is opened, the controller actuates the buckle moving mechanism on the front passenger seat side.

A vehicle pre-crash seat belt device of a seventh aspect of the present invention is any one of the first aspect to the fifth aspect, wherein in a case in which an occupant has sat in the vehicle seat when boarding, the controller actuates the buckle moving mechanism to move the buckle from the normal position toward the raised position, and the controller actuates the buckle moving mechanism to move the buckle from the raised position toward the normal position due to the tongue being engaged with the buckle.

In the vehicle pre-crash seat belt device of the seventh aspect, when the occupant puts on the seat belt during boarding, the buckle can be moved toward the raised position without the occupant operating the buckle moving mechanism.

A vehicle pre-crash seat belt device of an eighth aspect of the present invention is any one of the first aspect to the seventh aspect, wherein, in a vehicle seat to which a child seat is attached, even in a case in which the vehicle collision has been avoided after the controller is input with the signal from the collision prediction sensor, the controller controls the buckle moving mechanism so as to maintain the buckle in the normal position.

In the vehicle pre-crash seat belt device of the eighth aspect, in a vehicle seat to which a child seat is attached, the buckle is maintained in the normal position even in cases in which a vehicle collision has been avoided. The webbing that fixes the child seat is therefore not relaxed, enabling the attached state of the child seat to be suppressed from being released.

A vehicle pre-crash seat belt device of a ninth aspect of the present invention is any one of the first aspect to the eighth aspect, wherein, in a case in which a specific amount of time has elapsed without the controller receiving a signal from a collision sensor that detects collisions, the controller determines that the vehicle collision has been avoided.

A vehicle pre-crash seat belt device of a tenth aspect of the present invention is any one of the first aspect to the ninth aspect, further comprising a pre-tensioner that forcefully rotates the spool in the take-up direction of the webbing in a case in which the controller has been input with a signal from a collision sensor that detects collisions.

As explained above, the vehicle pre-crash seat belt device of the first aspect has the excellent advantageous effect of enabling a feeling of constriction to be suppressed from being imparted on the occupant in cases in which a vehicle collision has been avoided, while suppressing an increase in the number of components.

The vehicle pre-crash seat belt device of the second aspect has the excellent advantageous effect of enabling the occupant to restart or continue driving without the occupant operating the buckle moving mechanism in cases in which a vehicle collision has been avoided.

The vehicle pre-crash seat belt device of the third aspect has the excellent advantageous effect of enabling improvement in the ease of putting on the seat belt during boarding.

The vehicle pre-crash seat belt device of the fourth aspect has the excellent advantageous effect of enabling a child seat to be maintained in an attached state even in cases in which a vehicle collision has been avoided.

DETAILED DESCRIPTION

Figure 1:
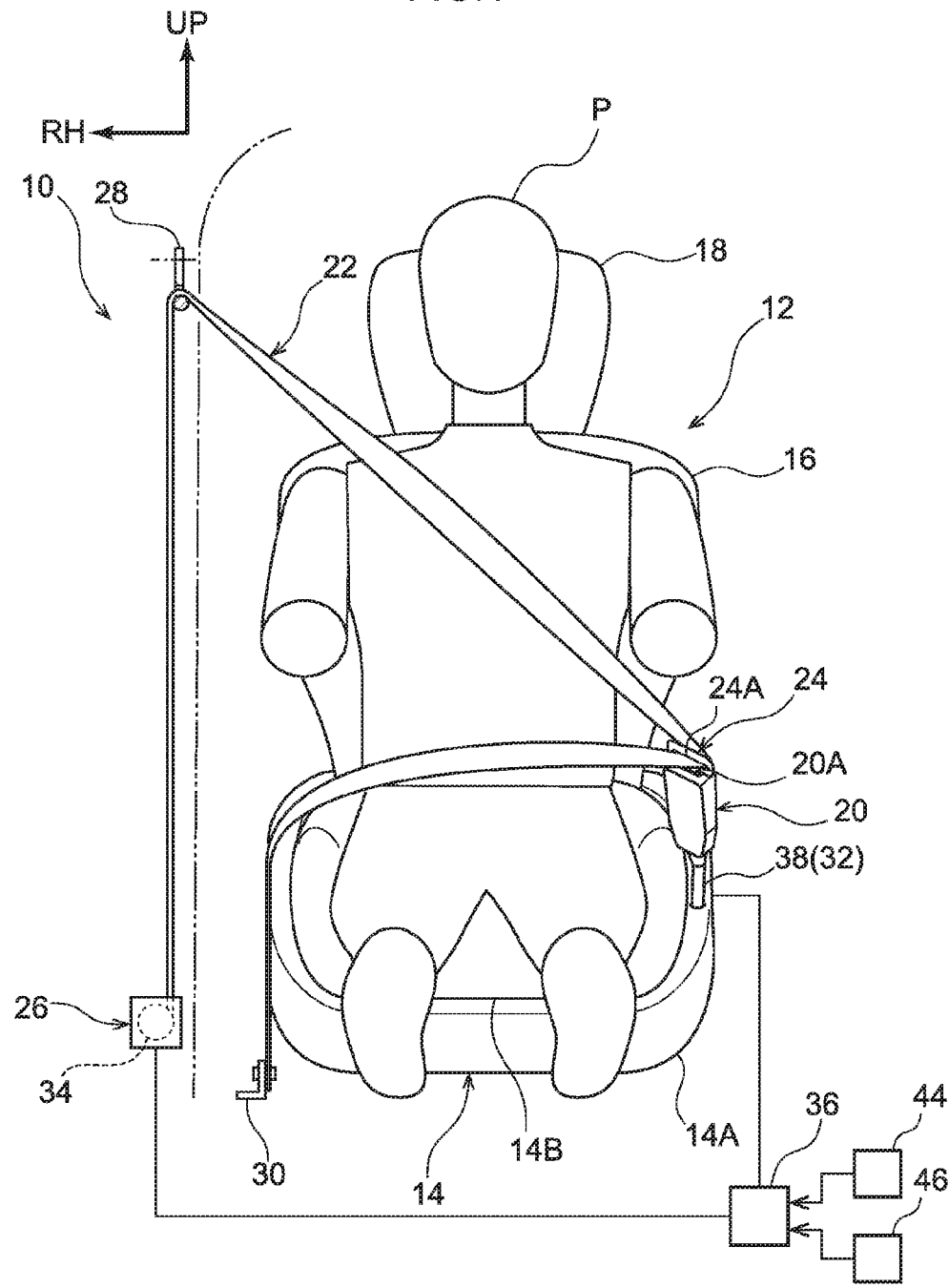
FIG. 1 is a face-on view illustrating a state in which an occupant is seated in a vehicle seat provided with a vehicle pre-crash seat belt device according to an exemplary embodiment, as viewed from the vehicle front side.

Explanation follows regarding a vehicle pre-crash seat belt device according to an exemplary embodiment of the present invention, with reference to FIG. 1 to FIG. 6. Note that in the drawings, the arrow FR indicates the seat front direction, the arrow UP indicates the seat upward direction, and the arrow RH indicates the seat right direction in a vehicle seat applied with the vehicle pre-crash seat belt device. The following explanation describes an exemplary embodiment in which the vehicle pre-crash seat belt device according to the present invention is applied to a vehicle seat provided as a seat on the vehicle right side. However, the vehicle pre-crash seat belt device according to the present invention may be applied to a seat on the vehicle left side. In such cases, the vehicle pre-crash seat belt device is disposed with left-right symmetry with respect to when applied to a seat on the vehicle right side.

As illustrated in FIG. 1, a vehicle seat 12 (referred to below simply as "seat 12") is configured including a seat cushion 14 on which an occupant P sits, and a seatback 16 that supports the back of the occupant P. An upper end portion of the seatback 16 is provided with a headrest 18 that supports the head of the occupant P.

The seat cushion 14 is configured with a cushion member 14B attached to a seat cushion frame 14A that is a framework member. A buckle moving mechanism 32 that configures a vehicle pre-crash seat belt device 10 of the present exemplary embodiment (referred to below simply as "seat belt device 10") is provided to the seat cushion frame 14A, and a buckle 20 is attached to the buckle moving mechanism 32.

The buckle 20 is formed in a substantially rectangular block shape, and an engagement hole 20A is formed in an upper face of the buckle 20. A tongue 24 engages with the engagement hole 20A of the buckle 20, and webbing (a seat belt) 22 is inserted through the tongue 24. A release operation section, not illustrated in the drawings, is provided to the buckle 20, and is configured such that a state of engagement between the buckle 20 and the tongue 24 can be released by operating the release operation section.

The webbing 22 is an elongated strap shaped belt for restraining the occupant P in the seat 12. One end portion of the webbing 22 is wound around a spool 34 that configures a retractor 26 provided to a lower portion further to the vehicle right side than the seat 12. The webbing 22 extends from the retractor 26 toward the seat upward direction, and is entrained around a shoulder anchor 28 disposed further toward the seat upward direction than the shoulders of the occupant P. The webbing 22 further extends obliquely from the shoulder anchor 28 toward a seat left side and a seat lower side toward the buckle 20. The other end portion of the webbing 22 passes through an insertion hole 24A of the tongue 24 engaged with the buckle 20, is folded back toward the seat right side, and is fixed to an anchor 30 disposed obliquely below the seat cushion 14.

Figure 2:
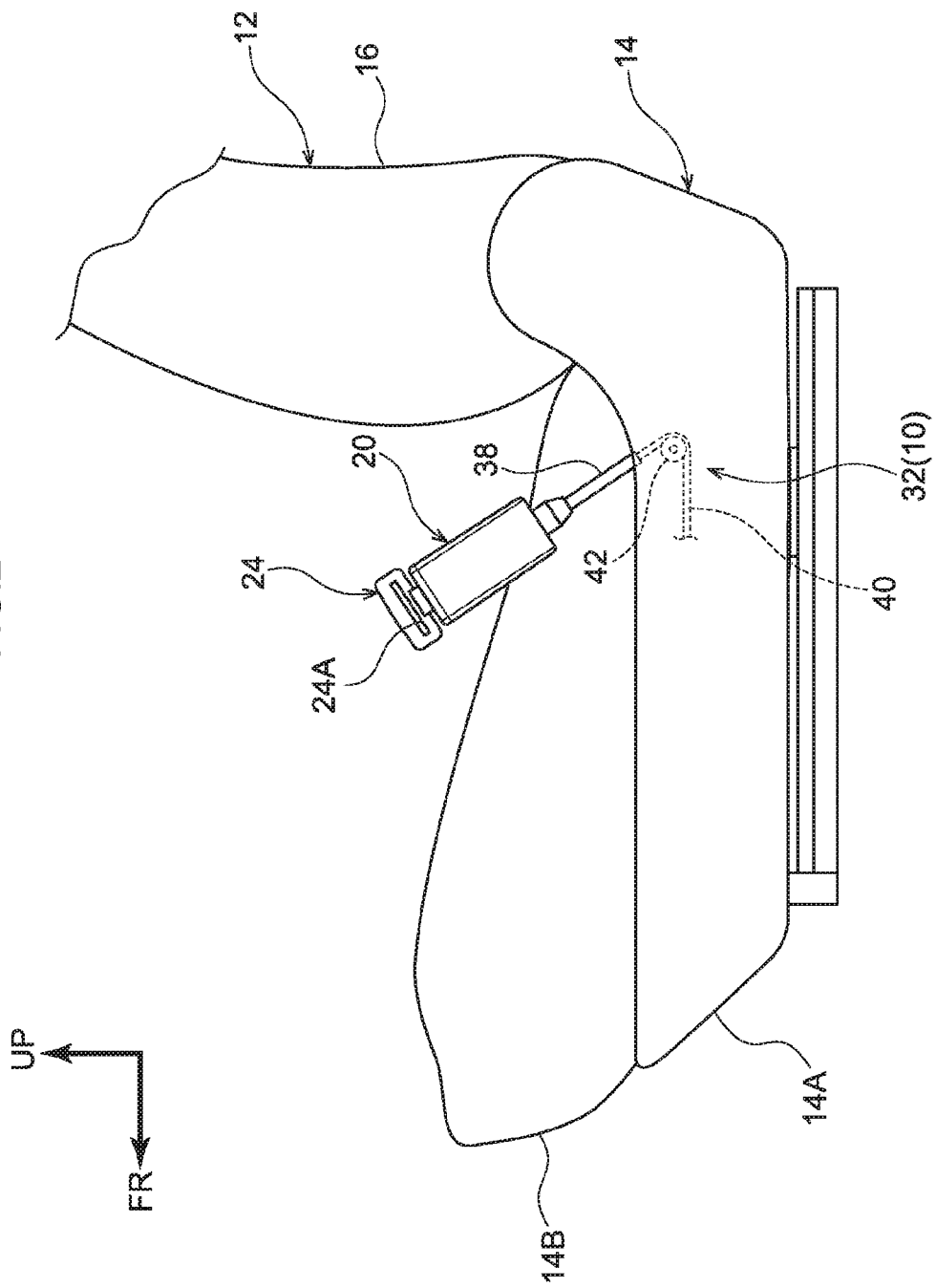
FIG. 2 is enlarged side view of a lower portion of the vehicle seat illustrated in FIG. 1, illustrating a state in which a buckle is positioned at a normal position.

As illustrated in FIG. 2, the buckle 20, through which the webbing 22 is inserted, is attached to a leading end of a wire 40 configuring the buckle moving mechanism 32 through a joint piece 38. The buckle moving mechanism 32 is a moving mechanism that moves the buckle 20 between a normal position and a raised position further toward the seat upward direction than the normal position.

Buckle Moving Mechanism

The buckle moving mechanism 32 is disposed at the seat left side of the seat cushion frame 14A and includes the wire 40 connected to a lower end portion of the buckle 20 through the joint piece 38. The wire 40 extends from the buckle 20 toward the seat lower side, is wound around a guide shaft 42, and then extends towards the seat front side. The other end portion of the wire 40 is fixed to a non-illustrated slider that is provided at a seat front side end portion of the seat cushion frame 14A.

The slider is configured so as to move in the seat front-rear direction by driving a non-illustrated motor. Accordingly, when the motor is driven to move the slider toward the seat rear direction, the other end portion of the wire 40 moves along the seat cushion frame 14A from the normal position illustrated in FIG. 2 toward the seat rear direction, as illustrated by the arrow in FIG. 3. One end portion of the wire 40 moves toward the seat upward direction along the guide shaft 42. The buckle 20 is thereby configured so as to be capable of moving to the raised position further toward the seat upward direction than the normal position. Note that the normal position of the present exemplary embodiment is substantially at the same height as the position of a buckle in a vehicle that is not provided with the buckle moving mechanism 32.

As illustrated in FIG. 1, the buckle moving mechanism 32 is electrically connected to an Electronic Control Unit (ECU) 36 serving as a controller. Note that the structure that moves the slider may employ a known structure such as a structure that moves by using a ball screw. Other structures may also be employed to enable the wire 40 to move. For example, a cylinder actuator may be employed.

Retractor

The retractor 26 is disposed at the seat right side, and is provided with the spool 34 around which the one end portion of the webbing 22 is wound. The spool 34 is provided inside the retractor 26 and is disposed so as to be capable of rotating in a take-up direction and a pull-out direction of the webbing 22. A non-illustrated motor is connected to the spool 34, and by driving the motor, the spool 34 rotates in the take-up direction to take up the webbing 22. However, in a non-loaded state in which no voltage is applied to the motor, pulling on the webbing 22 rotates the spool 34 in the pull-out direction, and the webbing 22 is pulled out.

The retractor 26 is provided with a lock mechanism, not illustrated in the drawings, that locks the rotation of the spool 34 in the pull-out direction. The lock mechanism is a known structure, and locks the rotation of the spool 34 when the vehicle brakes suddenly. In the present exemplary embodiment, a lock mechanism provided with a lock lever is employed as an example of the lock mechanism. In this structure, a gear that rotates as a unit with the spool 34 is provided, and the lock lever engages with the gear when the vehicle brakes suddenly, thereby locking the rotation of the spool 34 in the pull-out direction. Moreover, the structure employs a gear provided with ratchet teeth so as not to lock rotation of the spool 34 in the take-up direction. Configuration is made in which the locked state of the spool 34 by the lock mechanism is released by rotating the spool 34 in the take-up direction.

A pre-tensioner, not illustrated in the drawings, is provided to the retractor 26. The pre-tensioner is a known structure, and actuates during vehicle emergencies, such as during a vehicle collision. The spool 34 is configured so as to be forcefully rotated in the take-up direction of the webbing 22 by actuating the pre-tensioner. The retractor 26 and the pre-tensioner are electrically connected to the ECU 36. Note that examples of the pre-tensioner include devices provided with a squib (an ignition device) or a gas generating agent.

ECU

A collision sensor 44 and a collision prediction sensor 46 are electrically connected to the ECU 36. The collision sensor 44 is a sensor that detects vehicle collisions by acceleration (deceleration). For example, satellite sensors installed to left and right front side members and a floor sensor inside a floor ECU installed on the floor inside the vehicle cabin, may be employed. The collision prediction sensor 46 is a sensor that predicts vehicle collisions, and, for example, may employ a pre-crash sensor that predicts a collision with a colliding body using a milli-wave radar or a stereo camera. The ECU 36 controls the retractor 26, the pre-tensioner, and the buckle moving mechanism 32 based on signals being input from the collision sensor 44 and the collision prediction sensor 46.

The ECU 36 is configured so as to rotate the spool 34 in the take-up direction and thereby increase the tension acting on the webbing 22 according to a signal from the collision prediction sensor 46. The ECU 36 is configured to actuate the buckle moving mechanism 32 to move the buckle 20 from the normal position toward the raised position in cases in which a vehicle collision is avoided after a signal has been input from the collision prediction sensor 46.

Figure 5:
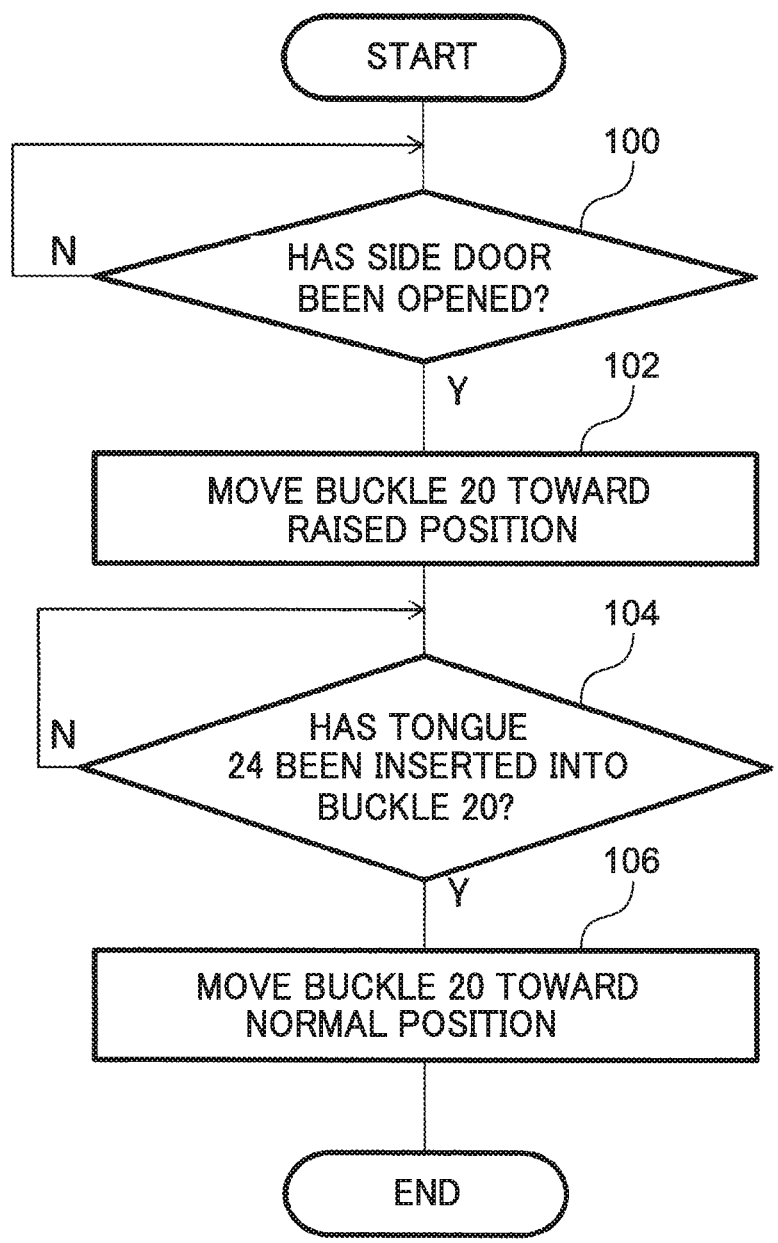
FIG. 5 is a flowchart illustrating a procedure in which an ECU according to an exemplary embodiment actuates a buckle moving mechanism, and is a flowchart illustrating operation when boarding.
Figure 6:
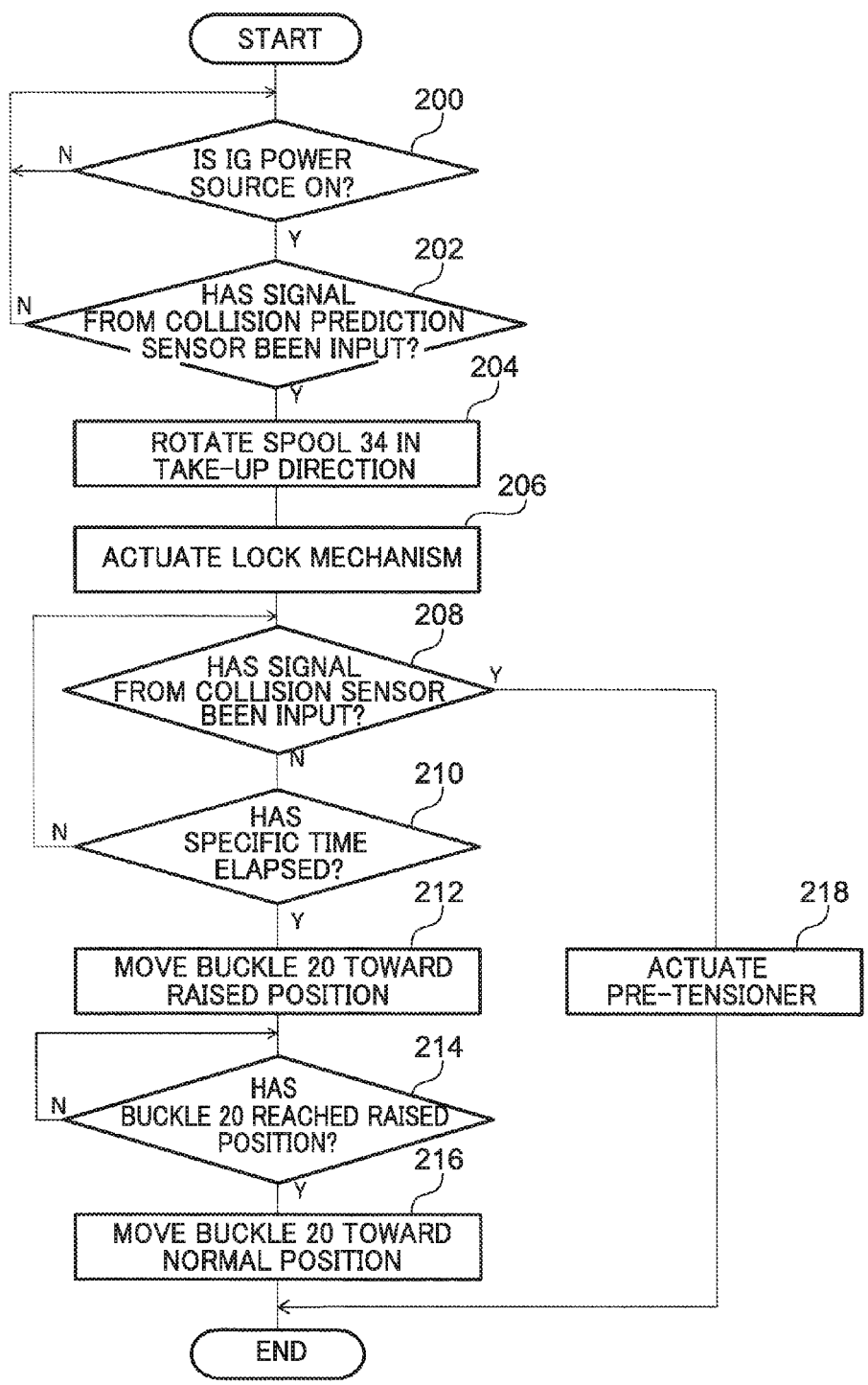
FIG. 6 is a flowchart illustrating a procedure in which an ECU according to an exemplary embodiment actuates a buckle moving mechanism, and is a flowchart illustrating a case in which a vehicle collision has been avoided after a signal from a collision prediction sensor has been input.

Detailed explanation follows regarding a procedure in which the ECU 36 actuates the buckle moving mechanism 32, based on the flowcharts in FIG. 5 and FIG. 6. Note that the flowchart in FIG. 5 is a flowchart illustrating a procedure in which the ECU 36 actuates the buckle moving mechanism 32 when boarding. The flowchart in FIG. 6 is a flowchart illustrating a procedure in which the ECU 36 actuates the buckle moving mechanism 32 in cases in which a vehicle collision is avoided after a signal has been input from the collision prediction sensor 46. In an initial state of the flowcharts in FIG. 5 and FIG. 6, the buckle 20 is positioned at the normal position illustrated in FIG. 2.

As illustrated in FIG. 5, at step 100, the ECU 36 determines whether or not a side door (a vehicle door) has been opened during boarding. When this is performed, the ECU 36 also determines whether the side door on the driver seat side has been opened, or whether the side door on the front passenger seat side has been opened. Note that in the following explanation, explanation follows regarding a case in which the pre-crash seat belt device is applied only to the driver seat and the front passenger seat. However, a similar pre-crash seat belt device may also be applied to rear section seats as well. In such cases, determination is similarly made as to whether or not the rear section seat side doors have been opened.

Figure 3:
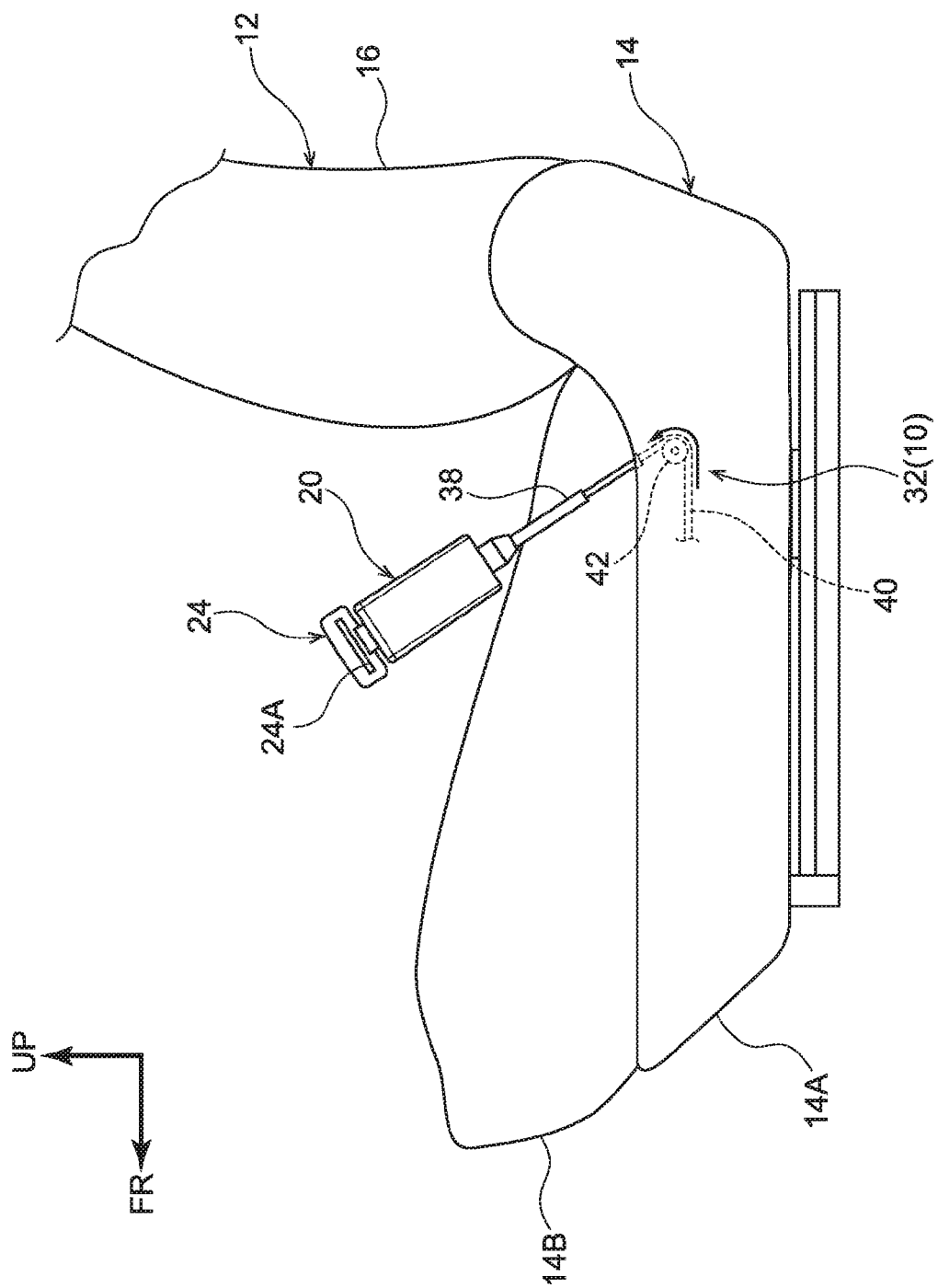
FIG. 3 is an enlarged side view corresponding to FIG. 2, illustrating a state in which the buckle has moved to a raised position.

Processing transitions to step 102 in cases in which the side door of at least one out of the driver seat and the front passenger seat has been opened. At step 102, the non-illustrated motor of the buckle moving mechanism 32 is driven by a signal from the ECU 36. As illustrated in FIG. 3, the wire 40 thereby moves such that the buckle 20 is moved toward the raised position. The tongue 24 thereby becomes easier to insert into the buckle 20 when the occupant P puts on the seat belt. Note that in the present exemplary embodiment, in cases in which the side door on the driver seat side has been opened, the motor of the buckle moving mechanism 32 of the driver seat is driven such that the buckle 20 on the driver seat side is moved toward the raised position. In cases in which the side door on the front passenger seat side has been opened, the motor of the buckle moving mechanism 32 of the front passenger seat is driven such that the buckle 20 on the front passenger seat side is moved toward the raised position.

At step 104, as illustrated in FIG. 5, determination is made as to whether or not the tongue 24 has been inserted into the buckle 20. Namely, determination is made as to whether or not the tongue 24 has engaged with the buckle 20. Processing transitions to step 106 when the tongue 24 has been inserted into the buckle 20.

At step 106, the non-illustrated motor of the buckle moving mechanism 32 is driven by a signal from the ECU 36 such that the buckle 20 is moved toward the normal position. When this is performed, the wire 40 moves to the opposite side, and the buckle 20 moves toward the normal position illustrated in FIG. 2 by rotating an output shaft of the motor in the opposite direction to that of when the motor is driven at step 102. During boarding, the ECU 36 actuates the buckle moving mechanism 32 to move the buckle 20 in the above manner.

Next, explanation follows regarding the procedure in which the ECU 36 actuates the buckle moving mechanism 32 in cases in which a vehicle collision has been avoided. At step 200, as illustrated in FIG. 6, determination is made as to whether or not an ignition power source (IG power source) is ON. Processing transitions to step 202 in cases in which the IG power source is ON.

At step 202, determination is made as to whether or not a signal from the collision prediction sensor 46 has been input to the ECU 36. Processing transitions to step 204 in cases in which a signal from the collision prediction sensor 46 has been input to the ECU 36, and processing returns to step 200 in cases in which a signal from the collision prediction sensor 46 has not been input to the ECU 36.

At step 204, the motor provided to the retractor 26 is driven by the signal from the ECU 36 such that the spool 34 is rotated in the take-up direction. The webbing 22 is thereby taken up such that the tension acting on the webbing 22 increases, increasing the restraining force of the webbing 22 on the occupant P.

Next, at step 206, the lock mechanism of the spool 34 is actuated in a state in which the restraining force of the webbing 22 on the occupant P has been increased. Rotation of the spool 34 in the pull-out direction is thereby locked, thereby suppressing the occupant P from moving under inertia toward the vehicle front. Note that in this case, rotation of the spool 34 in the take-up direction is still permitted, and so the spool 34 is biased toward the take-up direction using the motor.

Next, at step 208, determination is made as to whether or not a signal from the collision sensor 44 has been input to the ECU 36. In cases in which a signal from the collision sensor 44 has been input to the ECU 36, processing transitions to step 218, and the pre-tensioner is actuated by a signal from the ECU 36. The spool 34 is thereby forcefully rotated in the take-up direction of the webbing 22, such that the restraining force on the occupant P is further increased. Note that in this state, the buckle moving mechanism 32 is not actuated, and so the buckle 20 is maintained in the normal position.

Processing transitions to step 210 in cases in which a signal from the collision sensor 44 has not been input to the ECU 36 at step 208. At step 210, determination is made as to whether or not a specific time has elapsed. In cases in which the specific time has not elapsed, processing returns to step 208, and determination is made as to whether or not a signal from the collision sensor 44 has been input to the ECU 36. Processing transitions to step 212 in cases in which the specific time has elapsed without a signal from the collision sensor 44 being input to the ECU 36. Note that a sufficient amount of time for it to be clear that a collision has been avoided may be set as the specific time. For example, in cases in which the collision prediction sensor 46 has predicted that a collision will occur after two seconds, determination may be made that the collision has been avoided at a point of time after two seconds or more have elapsed.

Figure 4:
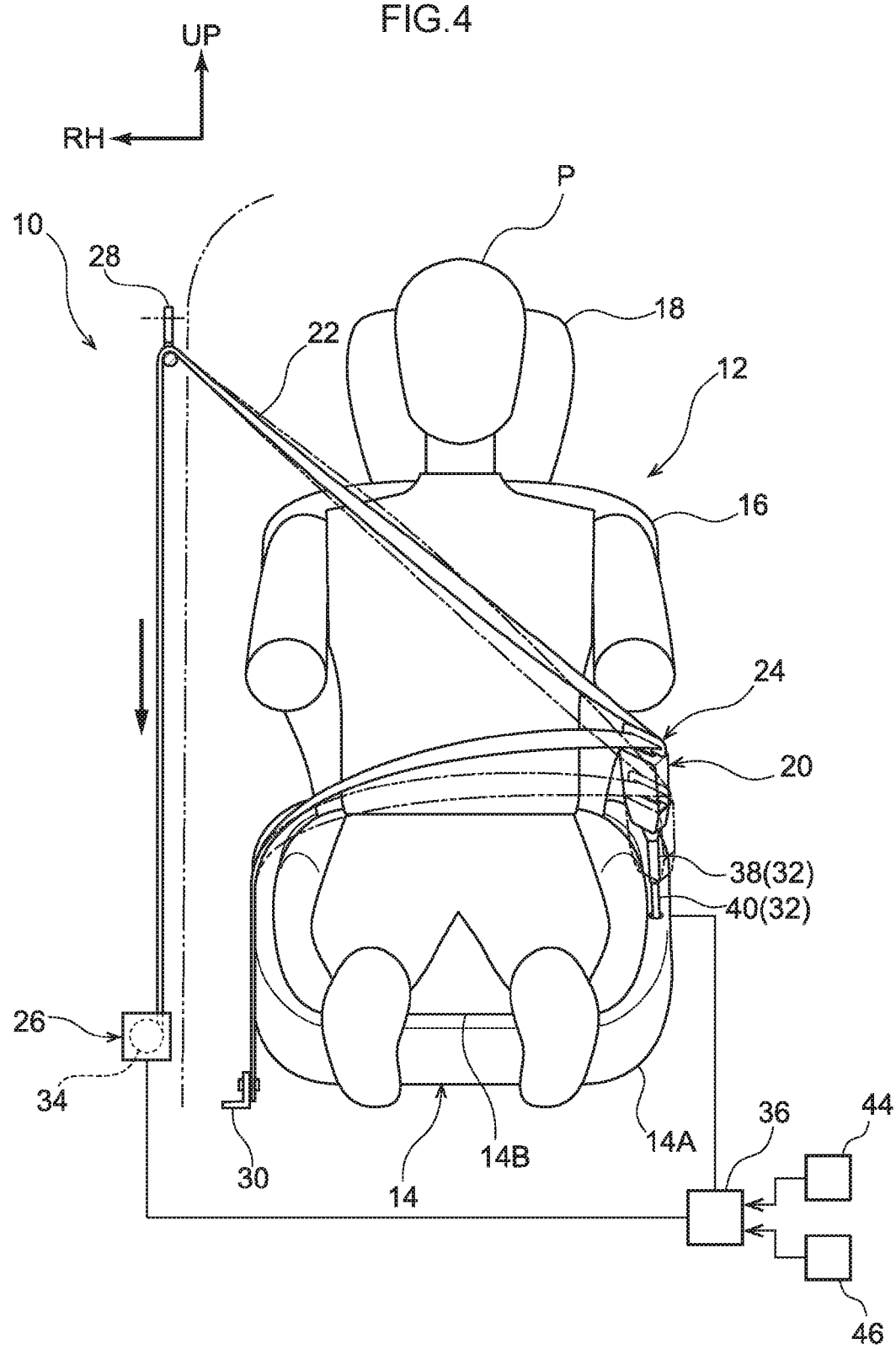
FIG. 4 is a face-on view corresponding to FIG. 1, illustrating a state in which a buckle has moved to a normal position by double-dotted intermittent lines, and illustrating a state in which the buckle has moved to a raised position by solid lines.

At step 212, the non-illustrated motor of the buckle moving mechanism 32 is driven by a signal from the ECU 36. As illustrated in FIG. 3, the wire 40 thereby moves such that the buckle 20 is moved toward the raised position. Due to the buckle 20 moving toward the raised position, as illustrated in FIG. 4, the webbing 22 is relaxed. Note that the spool 34 is biased in the take-up direction by the motor. The spool 34 therefore rotates in the take-up direction due to the webbing 22 relaxing. Moreover, the locked state of the spool 34 by the lock mechanism is released by the spool 34 rotating in the take-up direction.

Next, at step 214, determination is made as to whether or not the buckle 20 has reached the raised position. Processing transitions to step 216 in cases in which the buckle 20 has reached the raised position. At step 216, the non-illustrated motor of the buckle moving mechanism 32 is driven by a signal from the ECU 36 to move the buckle 20 toward the normal position. In the manner above, in cases in which a vehicle collision has been avoided, the ECU 36 actuates the buckle moving mechanism 32 to move the buckle 20.

Operation and Advantageous Effects

Next, explanation follows regarding operation and advantageous effects of the vehicle pre-crash seat belt device 10 according to the present exemplary embodiment.

In the seat belt device 10 according to the present exemplary embodiment, as illustrated in the flowchart in FIG. 5, when the occupant P opens a side door during boarding, the buckle 20 is moved from the normal position toward the raised position using the buckle moving mechanism 32. Moreover, when the tongue 24 is inserted into the buckle 20 (when the tongue 24 is engaged with the buckle 20), the buckle 20 is moved from the raised position toward the normal position using the buckle moving mechanism 32. The buckle 20 moves to the normal position without the occupant P performing any particular operation, thereby enabling a smooth start to driving.

As illustrated in step 204 in FIG. 6, in cases in which a signal from the collision prediction sensor 46 has been input to the ECU 36, the spool 34 of the retractor 26 is rotated in the take-up direction, and at step 206, the lock mechanism actuates, locking the rotation of the spool 34 in the pull-out direction. The restraining force of the webbing 22 on the occupant P can thereby be increased, and the occupant P can thereby be suppressed from moving toward the vehicle front under inertia when the vehicle brakes suddenly.

Furthermore, in cases in which a collision has been avoided after a signal from the collision prediction sensor 46 has been input to the ECU 36, the ECU 36 actuates the buckle moving mechanism 32 to move the buckle 20 from the normal position toward the raised position. The webbing 22 thereby relaxes, and the spool 34 rotates in the take-up direction such that the locked state of the spool 34 in the pull-out direction by the lock mechanism can be released. Namely, when locking of the spool 34 is released, a feeling of constriction can be suppressed from being imparted on the occupant P.

In cases in which a vehicle collision has been avoided, after having moved the buckle 20 toward the raised position, the ECU 36 moves the buckle 20 toward the normal position again. The occupant P can thereby restart or continue driving without operating the buckle moving mechanism 32.

Since the seat belt device 10 according to the present exemplary embodiment is not provided with a component for the sole purpose of relaxing the webbing 22, the number of components can be reduced, and space can be saved. Namely, a configuration provided with a component such as a pulley that relaxes the webbing 22 to suppress the feeling of constriction for the occupant P when locking of the spool 34 is released would increase the number of components and increase costs. In contrast, in the present exemplary embodiment, the buckle moving mechanism 32 provided to improve the ease of putting on seat belt can be used to release the locked state of the spool 34. As a result, the number of components can be reduced, and space can be saved.

Modified Example

Figure 7:
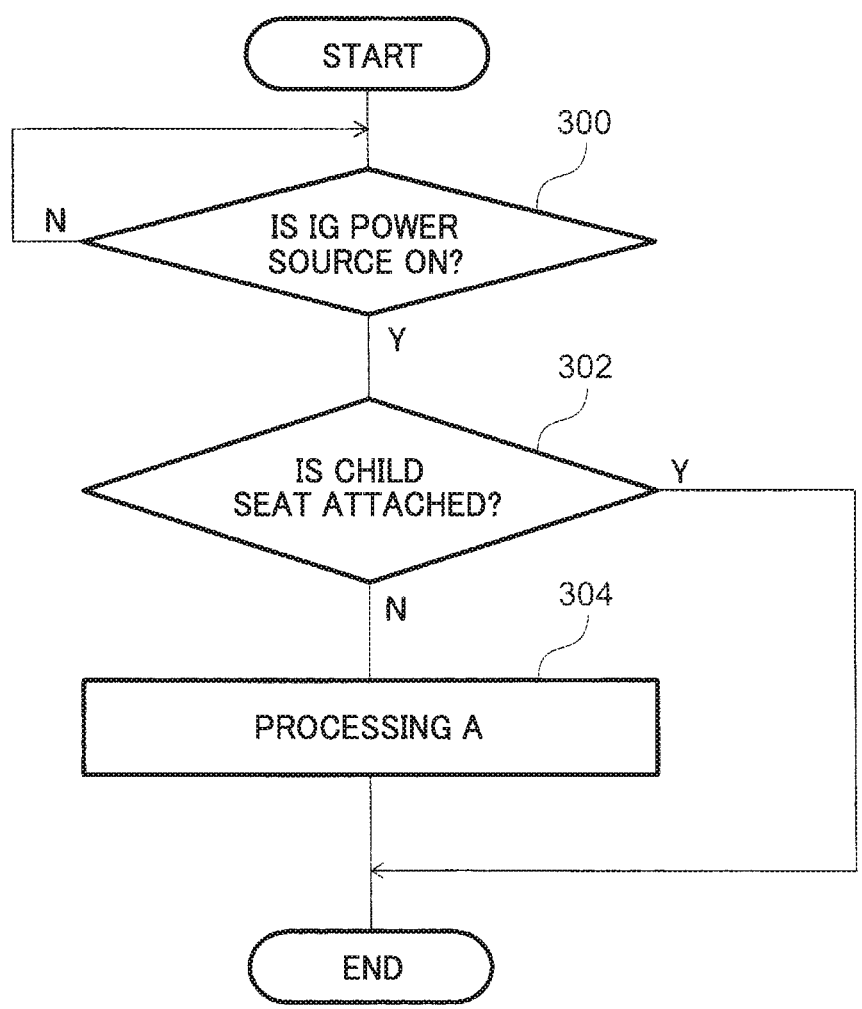
FIG. 7 is a flowchart illustrating a modified example of a procedure in which an ECU according to an exemplary embodiment actuates a buckle moving mechanism, and is a flowchart corresponding to FIG. 6.

Next, explanation follows regarding a modified example of the seat belt device 10 according to the present exemplary embodiment, with reference to the flowchart in FIG. 7. Note that in the present modified example, part of the flowchart in FIG. 6 is modified.

As illustrated in FIG. 7, the ECU 36 of the present modified example determines whether or not the IG power source has been turned ON at step 300. Processing transitions to step 302 when the IG power source is ON.

At step 302, determination is made as to whether or not a child seat (a Child Restraint System: CRS) is attached to the vehicle seat 12. In the present modified example, normally, an Emergency Locking Retractor (ELR) function is provided, and configuration is made to switch to an Automatic Locking Retractor (ALR) function when the webbing 22 is fully pulled out from the retractor 26. The ECU 36 ends processing in cases in which determination is made that a child seat is attached by a signal from a seating sensor or the like. Processing transitions to step 304 in cases in which determination is made that a child seat is not attached. At step 304, processing A is executed. Namely, the processing of step 202 onward in the flowchart in FIG. 6 is executed.

In the manner above, the ECU 36 according to the present modified example performs control so as not to actuate the buckle moving mechanism 32 when a child seat is attached to the seat, such that the buckle 20 is maintained in the normal position. Even in cases in which a vehicle collision has been avoided, the webbing 22 is therefore not relaxed, enabling release of the attached state of the child seat to be suppressed. Namely, the attached state of the child seat can be maintained. Note that in the present modified example, the ECU 36 determines that a child seat is attached by a signal from a seating sensor or the like. However, there is no limitation thereto, and other methods may be employed to detect the attachment of a child seat. For example, configuration may be made such that the ECU 36 can detect a state in which the webbing 22 has been fully pulled out, with determination being made that a child seat is attached in such cases. Moreover, configuration may be made such that detection of attachment of a child seat is made using a switch mechanism provided to an anchor of the seat cushion 14.

Explanation has been given regarding the seat belt device 10 according to an exemplary embodiment of the present invention; however, the present invention is not limited to the above exemplary embodiment, and obviously the present invention may be implemented within a range not departing from the spirit of the present invention. For example, in the present exemplary embodiment, in the flowchart in FIG. 5, in cases in which the side door on the driver seat side has been opened, configuration was made in which only the buckle 20 of the driver seat is moved toward the raised position. However, the present invention is not limited thereto. For example, configuration may be made in which in cases in which the side door on the driver seat side has been opened, the buckle 20 of the driver seat and the buckle 20 of the front passenger seat are both moved toward the raised position. In cases in which the seat belt device 10 is applied to the rear section seats, configuration may be made in which plural buckles 20 provided to the rear section seats are moved toward the raised position when the side door of one of the rear section seats has been opened.

In the flowchart in FIG. 5, the buckle 20 is moved toward the raised position due to opening of the side door; however, the buckle 20 may be moved toward the raised position at another timing. For example, the buckle 20 may be moved toward the raised position at a timing when an occupant sits down. In such cases, configuration may be made such that the ECU 36 moves the buckle 20 toward the raised position when input with a signal from a seating sensor.

Furthermore, in the flowchart in FIG. 6 in the present exemplary embodiment, after the spool 34 is rotated in the take-up direction at step 204, at step 206, the lock mechanism of the spool 34 is actuated; however, the present invention is not limited thereto. For example, a lock mechanism that is not electrically controlled may be employed. As an example of this, a structure may be employed in which the lock lever moves under inertia, and locks the rotation of the spool 34 in cases in which the vehicle enters a state of sudden deceleration, for example due to braking suddenly.

Furthermore, at step 210 in the flowchart in FIG. 6 in the present exemplary embodiment, determination that a vehicle collision has been avoided is made when the specific time has elapsed. However, determination that a vehicle collision has been avoided may be made by another method. For example, determination that a vehicle collision has been avoided may be made on receipt of a signal from a milliwave radar or a stereo camera.

In the present exemplary embodiment, at step 214 in the flowchart in FIG. 6, after making determination that the buckle 20 has moved to the raised position, the buckle 20 is moved toward the normal position; however, the present invention is not limited thereto. For example, configuration may be made in which after a specific time has elapsed since the output shaft of the motor of the buckle moving mechanism 32 has rotated, the output shaft of the motor is rotated in the opposite direction, and the buckle 20 returns toward the normal position. Configuration may also be made in which a sensor for detecting the locked state of the spool 34 is provided, and the buckle 20 is moved toward the normal position after a lock release signal has been input from the sensor to the ECU 36.

What is claimed is:

1. A vehicle pre-crash seat belt device comprising:
    a buckle moving mechanism that moves a buckle, with which a tongue that has a webbing inserted therein engages, between a normal position and a raised position that is further toward a seat upper side than the normal position;
    a retractor that includes:
        a spool around which one end portion of the webbing is wound and that is configured to rotate in a take-up direction and a pull-out direction of the webbing; and
        a lock mechanism that locks rotation of the spool in the pull-out direction, and that releases the locked state by causing rotation of the spool in the take-up direction; and
    a controller that, due to a signal from a collision prediction sensor that predicts a collision of a vehicle, causes rotation of the spool in the take-up direction and increases tension acting on the webbing, and actuates the buckle moving mechanism to move the buckle from the normal position toward the raised position in a case in which the vehicle collision has been avoided after the controller is input with the signal from the collision prediction sensor.

2. The vehicle pre-crash seat belt device of claim 1, wherein, in a case in which the vehicle has collided after the controller is input with the signal from the collision prediction sensor, the controller maintains the buckle in the normal position, and in a case in which the vehicle collision has been avoided after the controller is input with the signal from the collision prediction sensor, the controller actuates the buckle moving mechanism to move the buckle toward the normal position after moving the buckle from the normal position toward the raised position.

3. The vehicle pre-crash seat belt device of claim 2, wherein, after actuating the buckle moving mechanism to move the buckle from the normal position toward the raised position, the controller determines whether or not the buckle has reached the raised position, and in a case in which the buckle has reached the raised position, the controller actuates the buckle moving mechanism to move the buckle toward the normal position.

4. The vehicle pre-crash seat belt device of claim 2, wherein, after a specific amount of time has elapsed since actuating the buckle moving mechanism to move the buckle from the normal position toward the raised position, the controller actuates the buckle moving mechanism to move the buckle toward the normal position.

5. The vehicle pre-crash seat belt device of claim 1, wherein, in a case in which an occupant has opened a vehicle door when boarding the vehicle, the controller actuates the buckle moving mechanism to move the buckle from the normal position toward the raised position, and the controller actuates the buckle moving mechanism to move the buckle from the raised position toward the normal position due to the tongue being engaged with the buckle.

6. The vehicle pre-crash seat belt device of claim 5, wherein:
    the buckle moving mechanism is provided to both a driver seat and a front passenger seat, and
    in a case in which a vehicle door on the driver seat side is opened, the controller actuates the buckle moving mechanism on the driver seat side, and in a case in which a vehicle door on the front passenger seat side is opened, the controller actuates the buckle moving mechanism on the front passenger seat side.

7. The vehicle pre-crash seat belt device of claim 1, wherein, in a case in which an occupant has sat in a vehicle seat when boarding, the controller actuates the buckle moving mechanism to move the buckle from the normal position toward the raised position, and the controller actuates the buckle moving mechanism to move the buckle from the raised position toward the normal position due to the tongue being engaged with the buckle.

8. The vehicle pre-crash seat belt device of claim 1, wherein, in a vehicle seat to which a child seat is attached, even in a case in which the vehicle collision has been avoided after the controller is input with the signal from the collision prediction sensor, the controller controls the buckle moving mechanism so as to maintain the buckle in the normal position.

9. The vehicle pre-crash seat belt device of claim 1, wherein, in a case in which a specific amount of time has elapsed without the controller receiving a signal from a collision sensor that detects collisions, the controller determines that the vehicle collision has been avoided.

10. The vehicle pre-crash seat belt device of claim 1, further comprising a pre-tensioner that forcefully rotates the spool in the take-up direction of the webbing in a case in which the controller has been input with a signal from a collision sensor that detects collisions.

\* \* \* \* \*